United States Patent Office 2,861,878
Patented Nov. 25, 1958

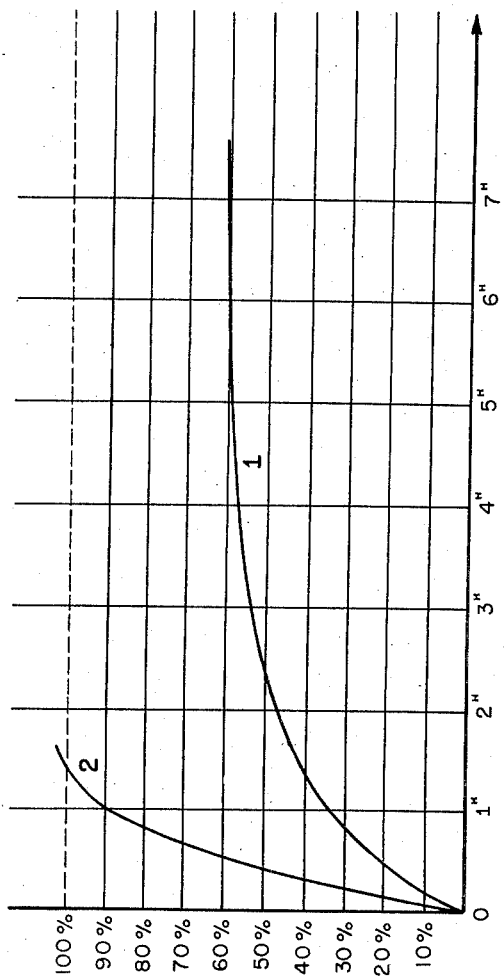

2,861,878
MANUFACTURE OF COMPLEX FERTILIZERS

Bernard Bigot, Rouen, France, assignor to Societe Anonyme des Manufactures des Glaces et Produits Chimiques de Saint-Gobain, Chauny & Cirey, Paris, France Application December 8, 1954, Serial No. 473,945

Claims priority, application France December 10, 1953

7 Claims. (Cl. 71—39)

This invention relates to the manufacture of complex fertilizers containing nitrogen in nitrate radicals and in ammonium radicals, containing phosphoric acid which is soluble in ammonium citrate, and possibly potassium. It is already known to produce such fertilizers by a process over which this invention is an improvement. The said prior art process includes an attack upon phosphate of fertilizer grade, of which the natural phosphates of Morocco and Florida are examples, by means of nitric acid, the product of that reaction being thereafter attacked by ammonia in order to precipitate calcium phosphate. The resultant product is then treated simultaneously by insufflation with ammonia and carbon dioxide in proportions which are sufficient to convert the calcium nitrate to ammonium nitrate and calcium carbonate. In most cases the sludge thus obtained is granulated, sometimes with the addition of potassium salts.

It is important in that prior art process that the resulting fertilizer shall not contain any calcium nitrate, because that salt is deliquescent and makes the fertilizer hygroscopic, which is a grave inconvenience during the use and storage of the fertilizer. It is precisely because of the need of eliminating calcium nitrate that, in that process, it is necessary to react the sludge resulting from the action of nitric acid with definite quantities of ammonia and $CO_2$ gas. That process is beset with difficulties on the industrial scale because the carbon dioxide gas is absorbed only with difficulty, so that extended periods of time are required to attain any approach toward a satisfactory degree of reaction, that is to say, toward the total transformation and disappearance of calcium nitrate.

It is an object of the present invention to overcome the difficulties inherent in that prior art process and to carry the simultaneous reaction of the carbon dioxide gas and ammonia to completion within a period of time compatible with a completely industrial process and far shorter than the duration previously possible.

The objects of the invention are accomplished, generally speaking, by carrying out the step in which the reaction of the mass with carbon dioxide and ammonia occurs, in the presence of at least one water-soluble, alkali metal salt of a weak acid. The term "weak acid" as employed herein does not include weakness achieved by mere dilution. The weak acids employed in making the alkali metal salts, are acids which, in equal concentration, are weaker than nitric acid, sulfuric or hydrochloric acid. They are preferably weak mineral or organic acids such as to sequestrate calcium ions.

Among the salts thus to be added to the reaction mass, which may be added prior to the actual step of reaction with ammonia and $CO_2$, or during that reaction, particularly effective results are obtained with water-soluble alkali metal salts of mineral poly acids, particularly the polyphosphates, hexametaphosphates, pyrophosphates, polysilicates, metasilicates, and other acids of that type. One such salt may be used or combinations of salts may be employed. For example, it has been found very advantageous to use a mixture of sodium metasilicate with tetrasodium pyrophosphate in combination, or of sodium hexametaphosphate $(NaPO_3)_6$ with either sodium tripolyphosphate $(Na_5P_3O_{10})$, or with sodium tetrapolyphosphate $(Na_6P_4O_{13})$. The organic alkali metal salts which are suitable according to the invention comprise tartrates, citrates, salts of the aminopolycarboxylic acids. One may employ a single one of these salts or a mixture of several of them. The choice of particular salts is influenced by cost.

The quantity of these adjuvant salts necessary to achieve a satisfactory result is variable, but in all cases is quite small, generally between .05 and 2% by weight of the phosphate treated.

It is also helpful to add to the adjuvant salts of the invention surface active agents such as the alkyl-aryl sulfonates, or to add protective colloids such as sulphite lye or salts of tannic acid such as sodium tannate.

The adjuvant salts may be introduced at any time prior to or during the insufflation with ammonia and $CO_2$. If one employs a salt which is hydrolyzable (for instance the polyphosphates) or which is susceptible of being destroyed by the acidity of the sludge, it is preferable to withhold its addition until, thanks to the effect of the addition of ammonia, the pH of the sludge has attained a value approaching or approximating neutrality, for example between pH 4 and pH 7. One may also add the adjuvant salt in small successive fractions. In particular, a high temperature in the reaction mass favors the hydrolysis of certain adjuvants even at pH 7 and in such cases it is recommended to introduce the adjuvant salt continuously at the same time as the ammonia and the carbon dioxide gas.

The invention applies equally to a process in which there is employed only a part of the $CO_2$ necessary to transform the whole of the calcium nitrate into ammonium nitrate and calcium carbonate, for example 60%, the residual calcium nitrate being allowed to remain in the fertilizer, or being transformed by any other known method such as by the addition of sulfuric acid or of a sulphate, phosphoric acid or a phosphate. Even in this case the invention is valuable because it makes it possible to reduce the size of the apparatus employed to make an equal quantity of fertilizer and to shorten the time required for the absorption of the gas.

The following examples illustrate the invention comparatively, the first example illustrating the prior art process and its results, the second conforming to this invention and carrying out the insufflation with mixed gases in the presence of a mixture of sodium tripolyphosphate and sodium metasilicate.

EXAMPLE 1

In a vessel provided with an agitator there was introduced 307 kilos of Moroccan phosphate containing 33.5% of $P_2O_5$ and 540 kilos of nitric acid of 50% concentration. When the attack ended 38.5 kilos of anhydros ammonia were added, precipitating bicalcium phosphate. Thereafter there was simultaneously introduced $CO_2$ and $NH_3$ in equivalent amounts ($2NH_3$ to $1CO_2$); the quantity of gas absorbed without loss was relatively large during the first part of the reaction, but decreased rapidly. At the end of five hours 26.7 kilos of $CO_2$ and 20.6 kilos of ammonia, which is 60% of the amount theoretically necessary for completion of the reaction. At that time the rate of absorption of the gases had decreased until it was negligible. The addition of gases was stopped, the mass was dried and was granulated with the addition of 283 kilos of KCl of 60% $K_2O$. The product was one ton of ternary fertilizer containing as fertilizing elements nitric nitrogen 6%, ammoniacal nitrogen 4.9%, $P_2O_5$ 10.3% of which 10% were soluble in ammonium citrate, and 17% $K_2O$. There were 1.1% of nitrogen under the form of calcium nitrate, representing 6.5% of the total fertilizer, which reduced its conservation materially.

EXAMPLE 2

The exact procedure of Example 1 was followed except that there was added to the sludge, after the precipitation of the bicalcium phosphate by the 38.5 kg. of anhydrous ammonia, .6 kilo of sodium tripolyphosphate and .6 kilo of sodium metasilicate. The introduction of $NH_3$ and $CO_2$ as in Example 1 and the absorption thereof was rapid and total; in less than 1½ hours the mass had absorbed the amount theoretically necessary to complete the reaction, that is to say 44.5 kilos $CO_2$, 34.4 kilos $NH_3$. The mass was dried and granulated with the addition of 250 kilos of KCl containing 60% $K_2O$. The mass was granulated and dried by known methods. The product was 1 ton of fertilizer, completely granulated, containing 6% nitric nitrogen, 6% ammoniacal nitrogen, 10.3% $P_2O_5$ of which 10% was soluble in ammonium citrate, and 15% $K_2O$. There was no calcium nitrate in this fertilizer.

The process is equally successful with continuous processes of manufacture.

The advantages of the invention are substantial, some of which are shown on the accompanying graph, which represents the curves of saturation of a sludge which had been produced by nitric acid attack on Moroccan phosphate, the abscissa of which shows the time in hours during which $CO_2$ and $NH_2$ are admitted, beginning with the moment at which the gases are jointly admitted, and the ordinate of which shows that percentage by weight of $CO_2$ actually fixed in the sludge at each moment compared to the amount (100%) theoretically necessary to convert all the lime nitrate to calcium carbonate and ammonium nitrate. The first curve, 1 on the graph, shows the prior art process, the second, 2 on the graph, shows the same process, carried out identically as to ingredients, quantities and conditions except for the addition of the adjuvants characteristic of this invention and the absorption of the greater quantities of $CO_2$ and $NH_3$ allowed by this process. Curve 1 shows that for an operation carried out under prior art conditions it required about 5 hours to fix 60% of the quantity of $CO_2$ necessary and that further insufflation produced no material advantage. Curve 2 shows that under identical conditions, in the same apparatus, but with the addition of equal quantities of $Na_5P_3O_{10}$ and $Na_2SiO_2 \cdot 2H_2O$ (sodium tripolyphosphate and sodium metasilicate) constituting .4% of the weight of phosphate treated, at the end of an hour 90% of the $CO_2$ needed for complete transformation has been fixed, and that in about 1½ hours more than 100% of that theoretically necessary was absorbed, which meant that ammonium carbonate was forming in the sludge, which no longer contained $Ca(NO_3)_2$.

EXAMPLE 3

The same procedure as in Example 1 was followed except that there was added to the sludge, after the precipitation of the bicalcium phosphate by the 38.5 kg. of anhydrous ammonia, the adjuvants quoted in the table.

In this table is given for each case the percent of $CO_2$ fixed in the sludge in a commercially reasonable time, compared to the theoretical quantity necessary for completion of the reaction Table

| Adjuvant | Percent $CO_2$ fixed | Time |
| --- | --- | --- |
| 1 kg. sodium tripolyphosphate | 100 | 1 hr. 40 min. |
| 1 kg. sodium hexametaphosphate | 100 | 1 hr. 40 min. |
| 1 kg. sodium citrate | 95 | 1 hr. 50 min. |
| 1 kg. sodium tartrate | 95 | 1 hr. 50 min. |
| 1 kg. sodium borate | 90 | 2 hr. |
| 1 kg. sodium ethylene diaminotetracetate | 90 | 2 hr. |

The invention involves the following concepts alone or in combination: a process of making fertilizer by the attack of nitric acid on phosphate of fertilizer grade, particularly natural lime phosphate, followed by ammoniation and insufflation with ammonia and carbon dioxide, in quantity sufficient to transform lime nitrate to ammonium nitrate, in the presence of a water soluble alkali metal salt of an acid mineral or organic which preferably produces complex ions with calcium. Preferred members of the operative class are alkali metal polyphosphates, alkali metal pyrophosphates, alkali metal hexametaphosphates, alkali metal polysilicates, alkali metal metasilicates and other alkali metal salts of such types. The quantity of the adjuvant is usually sufficient in the range .05 to 2% by weight of the natural phosphate treated. The pH of the sludge is preferably above 4 at the time of insufflation with the mixed gases. Insufflation may be continuous or in successive fractions, and the adjuvant may be added at once or throughout the insufflation.

As many apparently widely different embodiments of the present invention may be made without departing from the spirit and scope thereof, it is to be understood that the invention is not limited to the specific embodiments.

What is claimed is:

1. In a process of making fertilizers from phosphates of fertilizer grade, ammonia, and nitric acid, containing nitrogen in nitrate and in ammonium radicals, and containing phosphoric acid soluble in ammonium citrate, in which process lime phosphate is attacked by nitric acid, the product so formed is attacked by ammonia, and the resultant product is simultaneously reacted with ammonia and carbon dioxide, the step of carrying out the ammonia-carbon dioxide reaction in the presence of a quantity, on the order of .05 to 2% by weight of the phosphate treated, of at least one water soluble alkali metal salt of a mineral polyacid.

2. In a process of making fertilizers from phosphates of fertilizer grade, ammonia, and nitric acid, containing nitrogen in nitrate and in ammonium radicals, and containing phosphoric acid soluble in ammonium citrate, in which process lime phosphate is attacked by nitric acid, the product so formed is attacked by ammonia, and the resultant product is simultaneously reacted with ammonia and carbon dioxide, the step of carrying out the ammonia-carbon dioxide reaction in the presence of a quantity, on the order of .05 to 2% by weight of the phosphate treated, of a soluble alkali metal salt of the group consisting of alkali metal poly phosphates, alkali metal hexametaphosphates, alkali metal pyrophosphates, alkali metal poly silicates, alkali metal metasilicates.

3. In a process of making fertilizers from phosphates of fertilizer grade, ammonia, and nitric acid, containing nitrogen in nitrate and in ammonium radicals, and containing phosphoric acid soluble in ammonium citrate, in which process lime phosphate is attacked by nitric acid, the product so formed is attacked by ammonia, and the resultant product is simultaneously reacted with ammonia and carbon dioxide, the step of carrying out the ammonia-carbon dioxide reaction in the presence of a quantity, on the order of .05% to 2% by weight of the phosphate treated, of sodium metasilicate and tetrasodium pyrophosphate.

4. In a process of making fertilizers from phosphates of fertilizer grade, ammonia, and nitric acid, containing nitrogen in nitrate and in ammonium radicals, and containing phosphoric acid soluble in ammonium citrate, in which process lime phosphate is attacked by nitric acid, the product so formed is attacked by ammonia, and the resultant product is simultaneously reacted with ammonia and carbon dioxide, the step of carrying out the ammonia-carbon dioxide reaction in the presence of a quantity, on the order of .05 to 2% by weight of the phosphate treated, of sodium hexametaphosphate and sodium tripolyphosphate.

5. In a process of making fertilizers from phosphates of fertilizer grade, ammonia, and nitric acid, containing nitrogen in nitrate and in ammonium radicals, and containing phosphoric acid soluble in ammonium citrate, in which process lime phosphate is attacked by nitric acid, the product so formed is attacked by ammonia, and the resultant product is simultaneously reacted with ammonia and carbon dioxide, the step of carrying out the ammonia-carbon dioxide reaction in the presence of a quantity, on the order of .05 to 2% by weight of the phosphate treated, of alkali metal salts of the group consisting of hexametaphosphates, polyphosphates, pyrophosphates, polysilicates, metasilicates, citrates, tartrates, borates, aminopolycarboxylates.

6. In a process according to claim 5 the step of introducing the defined adjuvant salts in the sludge at a pH approximately neutral.

7. The process of claim 2 in which only a part of the $CO_2$ necessary to transform the whole of the calcium nitrate into ammonium nitrate and calcium carbonate is used, the residual calcium nitrate being allowed to remain at least temporarily in the reaction mass.

References Cited in the file of this patent

UNITED STATES PATENTS

| | | |
|---|---|---|
| 1,854,291 | Burdick | Apr. 19, 1932 |
| 1,948,520 | Harvey | Feb. 27, 1934 |
| 2,555,656 | Plusje et al. | June 5, 1951 |
| 2,683,075 | Caldwell | July 6, 1954 |
| 2,738,265 | Neilsson | Mar. 13, 1956 |